United States Patent
Yamamoto et al.

(10) Patent No.: US 7,556,110 B2
(45) Date of Patent: Jul. 7, 2009

(54) VEHICLE MOUNTED WITH ELECTRIC STORAGE APPARATUS

(75) Inventors: Akio Yamamoto, Saitama (JP); Minoru Matsunaga, Saitama (JP); Koichi Yamamoto, Saitama (JP); Masahiro Matsutani, Saitama (JP); Mitsunori Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 157 days.

(21) Appl. No.: 11/533,952

(22) Filed: Sep. 21, 2006

(65) Prior Publication Data

US 2007/0062746 A1    Mar. 22, 2007

(30) Foreign Application Priority Data

Sep. 22, 2005    (JP) ............................. 2005-275645

(51) Int. Cl.
   *B60R 16/00*    (2006.01)
(52) U.S. Cl. .................. 180/65.3; 180/65.1; 180/68.1; 180/68.5
(58) Field of Classification Search ....... 180/65.1–65.3, 180/68.1, 68.5; 429/120
See application file for complete search history.

(56) References Cited

U.S. PATENT DOCUMENTS

| | | | | |
|---|---|---|---|---|
| 5,082,075 A | * | 1/1992 | Karolek et al. ............. | 180/68.2 |
| 5,871,041 A | * | 2/1999 | Rafalovich et al. ............ | 165/10 |
| 6,211,645 B1 | * | 4/2001 | Kouzu et al. ................. | 320/107 |
| 6,569,556 B2 | * | 5/2003 | Zhou et al. ..................... | 429/88 |
| 6,648,085 B2 | * | 11/2003 | Nagura et al. .............. | 180/65.1 |
| 7,108,091 B2 | * | 9/2006 | Guidry et al. .............. | 180/68.1 |
| 7,189,473 B2 | * | 3/2007 | Smith et al. ................... | 429/82 |
| 2004/0094340 A1 | * | 5/2004 | Kawasaki et al. .......... | 180/65.1 |
| 2004/0134694 A1 | * | 7/2004 | Allen et al. ................ | 180/65.1 |
| 2004/0134699 A1 | * | 7/2004 | Shimizu ..................... | 180/68.5 |
| 2005/0139402 A1 | * | 6/2005 | Yamashita ................. | 180/65.3 |
| 2005/0224265 A1 | * | 10/2005 | Mizuno ...................... | 180/65.3 |
| 2006/0102398 A1 | * | 5/2006 | Mizuno ...................... | 180/65.3 |

FOREIGN PATENT DOCUMENTS

| | | | |
|---|---|---|---|
| EP | 1495896 A2 | * | 1/2005 |
| JP | 11086915 | * | 3/1999 |
| JP | 2003268738 | * | 9/2003 |
| JP | 2003-291655 A | | 10/2003 |

* cited by examiner

*Primary Examiner*—Christopher P Ellis
*Assistant Examiner*—Katy Meyer
(74) *Attorney, Agent, or Firm*—Westerman, Hattori, Daniels & Adrian, LLP.

(57) ABSTRACT

At least two or more energy storage units are disposed on the right and left sides, in a traveling direction, of a vehicle, and a drive unit for controlling these energy storage units is located between the two or more energy storage units. The drive unit is lower in height than the two or more energy storage units, whereby air passage are formed above the drive unit and between the two or more energy storage units.

5 Claims, 6 Drawing Sheets

VEHICLE MOUNTED WITH ELECTRIC STORAGE APPARATUS

The present invention claims foreign priority from Japanese patent application no 2005-275645, filed on Sep. 22, 2005, the content of which is incorporated herein by reference.

BACKGROUND OF THE INVENTION

1. Field of the Invention

The present invention relates to a vehicle mounted with an electric storage apparatus, the vehicle including an energy storage unit which can store electric energy, and a drive unit which controls the energy storage.

2. Description of the Related Art

Japanese Patent Unexamined Publication JP-A-2003-291655, for example, discloses a vehicle mounted with an electric-storage apparatus in which an energy storage unit (secondary battery in this case) can be cooled by providing a cooling air introducing duct on a hydrogen storage tank side, and introducing air, which is cooled by latent heat when hydrogen is emitted from the hydrogen storage tank, as secondary battery cooling air.

Such vehicle provided with an energy storage unit has a drive unit mounted thereon for controlling the energy storage. Since the drive unit also generates heat during operation, it must be cooled in order to keep its temperature suitable. However, in the related art described above, it is necessary to provide a cooling mechanism for the drive unit separately from the energy storage unit. As a result, it takes much space for cooling, and can affect a layout freedom of peripheral parts. Therefore, an improvement in such point is desirable.

SUMMARY OF THE INVENTION

It is an object of the present invention is to provide a vehicle mounted with an electric storage apparatus in which an energy storage unit as well as a drive unit can be cooled, with a layout freedom of peripheral parts being improved by reducing a space necessary for cooling.

A vehicle having an electric storage apparatus, comprising, at least two energy storage units (for example, batteries 12, 12 in FIG. 2) disposed on right and left sides, in a traveling direction, of the vehicle (for example, a fuel cell vehicle 1 in FIG. 2), and a drive unit (for example, contactor box 18 in FIG. 2), for controlling said energy storage units, is disposed between said energy storage units, wherein said drive unit is lower in height than said energy storage units.

According to this structure, by the air flowing in the air passage unit, not only the energy storage but also the drive unit can be cooled.

DETAILED DESCRIPTION OF THE INVENTION

Figure 1:
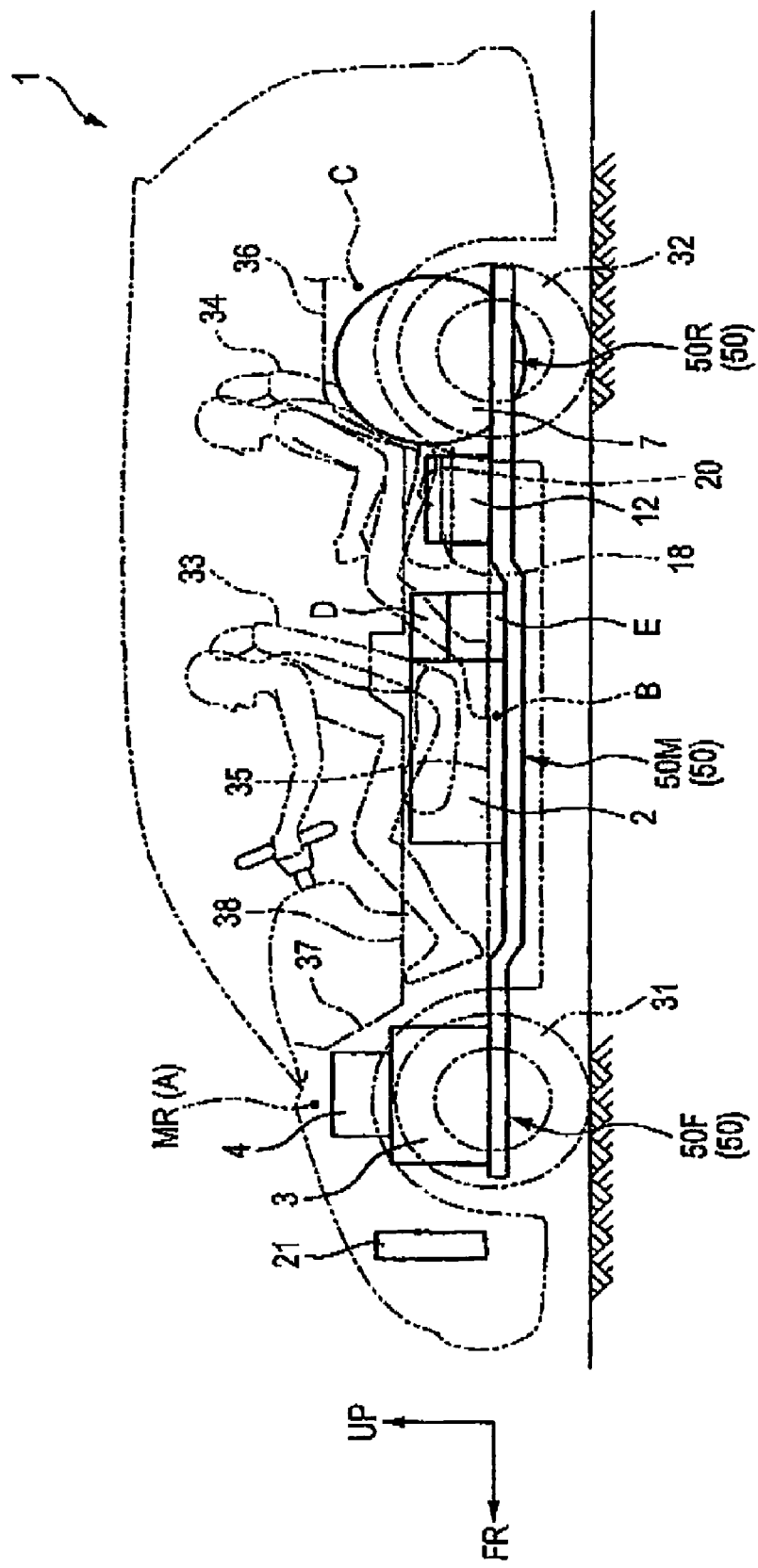
FIG. 1 is diagram illustrating a side surface of a fuel cell vehicle in an exemplary embodiment of the invention.

The invention will be described below with reference to the drawings. In the following description, directions of front, rear, left and right are the same as those in a vehicle as long as there is no particular description. Further, in the drawings, an arrow FR indicates a forward direction of vehicle, an arrow LH indicates a leftward direction of vehicle, and an arrow UP indicates an upward direction of vehicle.

A fuel cell vehicle 1 shown in FIGS. 1 and 2 has a fuel cell stack (hereinafter sometimes simply referred to as a fuel cell), which generates electricity by electrochemical reaction between hydrogen and oxygen, below a floor of the vehicle, and runs by driving a drive motor 3 with electric power generated in the fuel cell stack 2. The fuel cell stack 2 is known as polymer electrolyte membrane fuel cell (PEMFC) in which many unit fuel cells (unit cells) are stacked. Hydrogen gas as a fuel gas is supplied to an anode side of the fuel cell stack 2, and air including oxygen as oxidizing gas is supplied to an cathode side of the fuel cell stack 2, whereby electric power is generated by electrochemical reaction with water also being generated as a byproduct.

Figure 3:
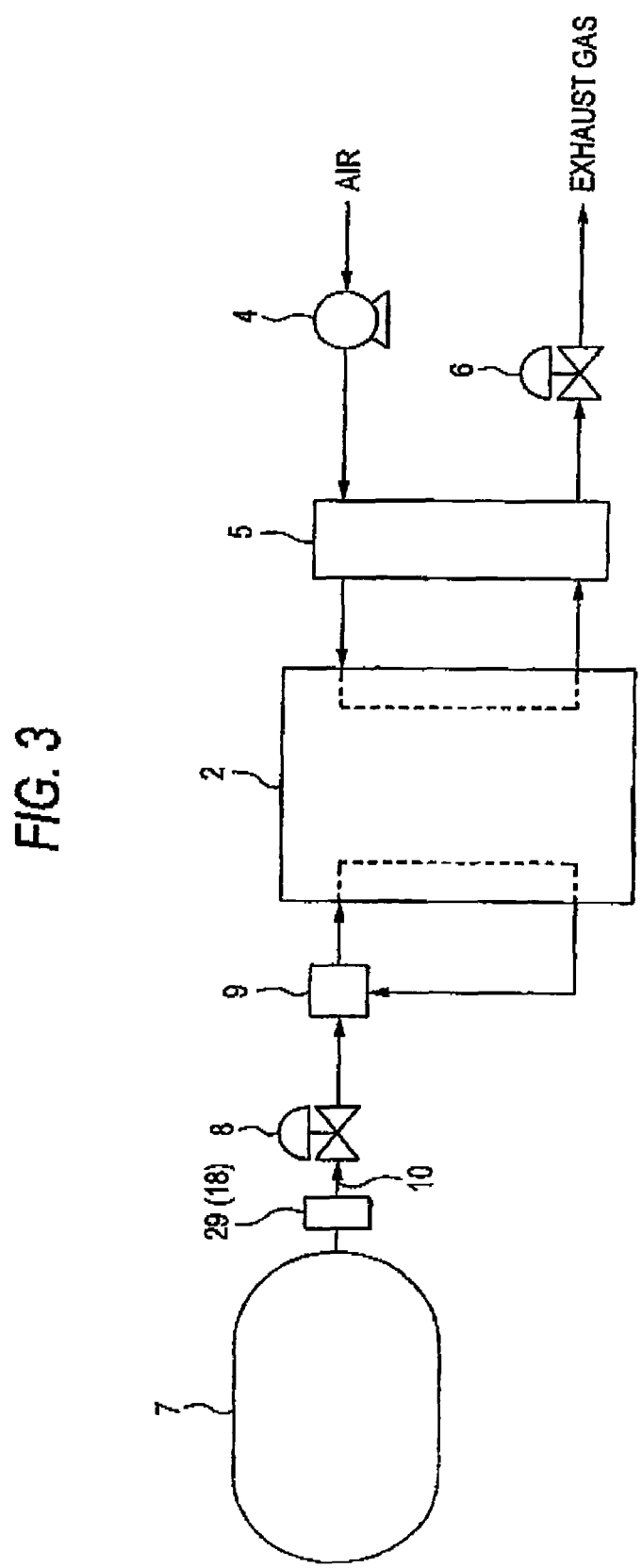
FIG. 3 is a schematic diagram of a fuel cell system in the fuel cell vehicle.

Referring to FIG. 3, an outline of a fuel cell system in the fuel cell vehicle 1 will be described. Firstly, air including oxygen is compressed by a compressor 4, is humidified by a humidifier 5, and is supplied to a cathode of the fuel cell 2. After being used for electricity generation, the air is exhausted from the fuel cell stack 2 (in FIG. 3, only the unit fuel cell is shown) and passes through the humidifier 5 as a humidification source, and thereafter exhausted through a pressure control valve 6. On the other hand, hydrogen gas in hydrogen tank 7, of which the pressure is reduced by a regulator 8, is supplied to an anode through an ejector 9. The excessive hydrogen gas is exhausted from the fuel cell 2 and aspirated into the ejector 9, and this excessive hydrogen gas flows together with fresh hydrogen gas fed from the hydrogen tank 7 and is supplied again to the fuel cell 2. Part of the hydrogen gas exhausted from the fuel cell 2 is fed to a dilution box 11 (refer to FIG. 4), and is diluted in the dilution box 11 with the reacted air exhausted from the pressure control valve 6, and thereafter exhausted. Further, a heater 29 is provided for a hydrogen supply pipe 10 on the upstream side of the ejector 9 (in this case, also on the upstream side of the regulator 8), and heats the hydrogen gas which flows through the hydrogen supply pipe 10. In the exemplary embodiment, as described in detail later, a contactor box 18 functions also as the heater 29.

Referring again to FIGS. 1 and 2, a pair of batteries 12, each formed in a rectangular parallelepiped having a rather low height in a vertical direction, are disposed, for example, on the left and right sides, below a rear seat 34. It is preferable that the battery 12 be a lithium battery. The battery 12 is used, for example, to store regenerative power from the drive motor 3 during the deceleration of the fuel cell vehicle 1. Further, the hydrogen tank 7 as a gas container having a cylindrical exterior is arranged at the diagonally lower back of the rear seat 34 so that its axial line is aligned in the width wise direction of the vehicle.

Hereinafter, the regulator 8 and the ejector 9 can be generically referred to as hydrogen supply accessories D, and the humidifier 5 and the dilution box 11 can be generically referred to as air exhausting accessories E.

A radiator 21, which cools the cooling medium circulating in the fuel cell 2, is located in front of the drive motor 3 and the compressor 4. It is preferable that the cooling medium be water with anti-freezing ingredient.

Figure 4:
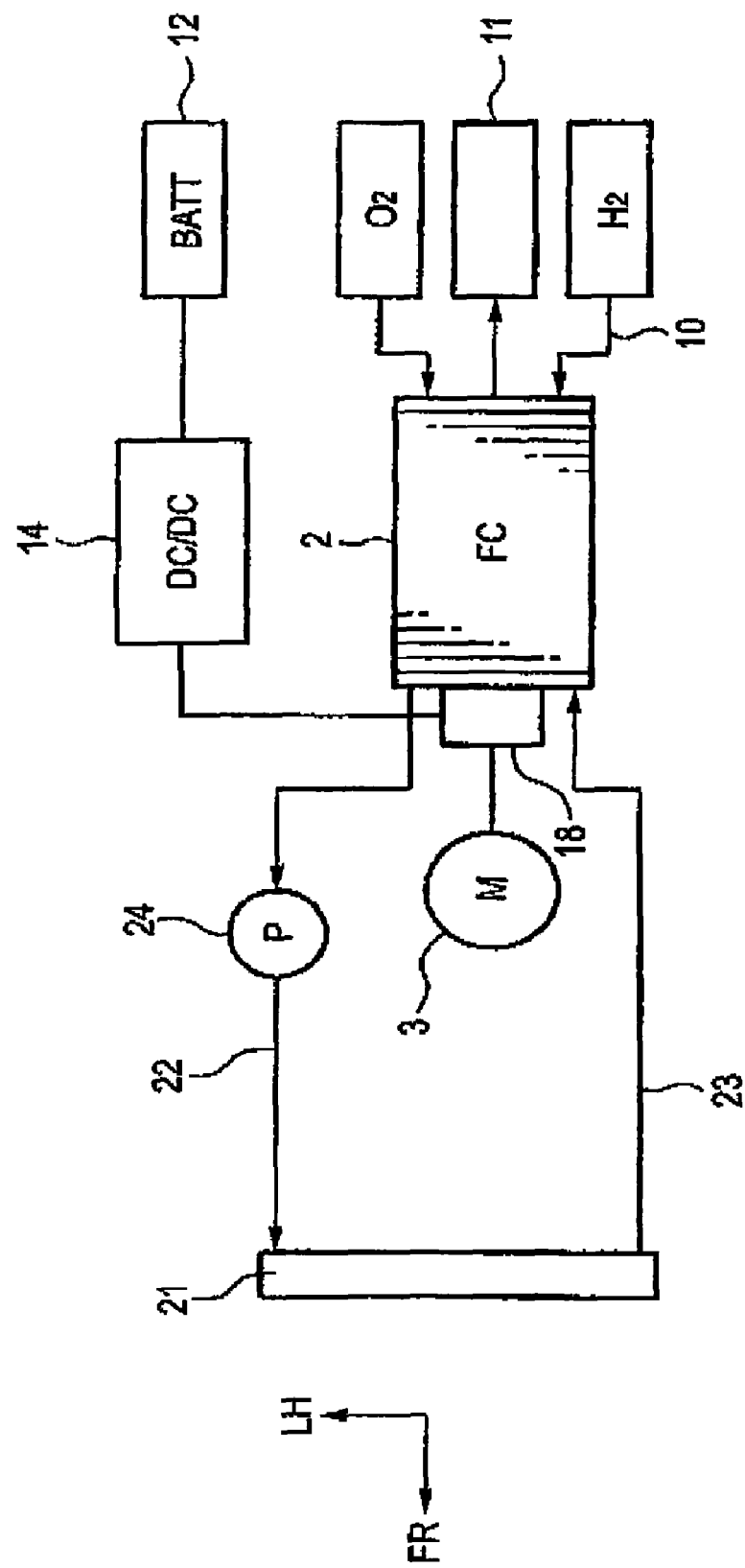
FIG. 4 is a schematic diagram showing a lower surface arrangement of parts relating to the fuel cell system.

Referring to FIG. 4, a cooling medium outflow pipe 22 and a cooling medium inflow pipe 23 are disposed between the fuel cell 2 and the radiator 21, and are respectively connected to a front end portion of the fuel cell 2. Further, a water pump 24 for cooling medium circulation is disposed on the cooling medium outflow pipe 22.

From a back end portion of the fuel cell 2, hydrogen gas and air are supplied to the fuel cell 2, and the reacted gas is exhausted to the dilution box 11 from the back end portion of fuel cell 2. Thus, by locating a gas supply port and a gas discharge port at the back end portion of the fuel cell 2, and by arranging an outlet and an inlet of the cooling water at the front end portion of the fuel cell 2, the rationalization of design of various pipes connected to the fuel cell 2 is performed, and the holding amount of cooling medium in the fuel cell vehicle 1 is reduced thereby reducing weight of the fuel cell vehicle 1.

The drive or regeneration of the drive motor 3 is controlled by a PDU (Power Drive Unit, not shown) according to the vehicle running condition and the power amount taken from the fuel cell 2 or the battery 12. The PDU, which is provided with an inverter including a switching element such as a FET, converts the DC power from the battery 12 or the fuel cell 2 into the desired AC power, and controls the voltage. Voltage between the fuel cell 2 and the battery 12 and voltage between the battery 12 and the drive motor 3 are adjusted by a DC/DC converter 14.

While the DC power from the fuel cell 2 is converted into AC power through an inverter (not shown) and is supplied to predetermined electric power driven components, a voltage thereof is stepped down through a downverter (not shown) and is also supplied to a 12V battery (not shown). As the predetermined electric power driven components, there are, for example, the compressor 4, the water pump 24, etc. Further, as 12V load components to which the power is supplied from the 12V battery, there are, for example, the valve 6, various lamp units, etc. In the drawings, a reference numeral 18 indicates a contactor box which limits power supply from the fuel cell 2, when necessary. In the exemplary embodiment, the PDU, the DC/DC converter 14, the inverter, and the downverter are housed within the contactor box 18.

The PDU, the DC/DC converter 14, the inverter, the downverter, and the contactor box 18 are connected to ECU (Electrical Control Unit, not shown) which controls the operation of the whole fuel cell system. The ECU controls and drives each of the components on the basis of a throttle opening signal, a brake signal, a vehicle speed signal, etc., whereby power generation of the fuel cell 2 is controlled, and regeneration power in the drive motor 3 is controlled.

Figure 2:
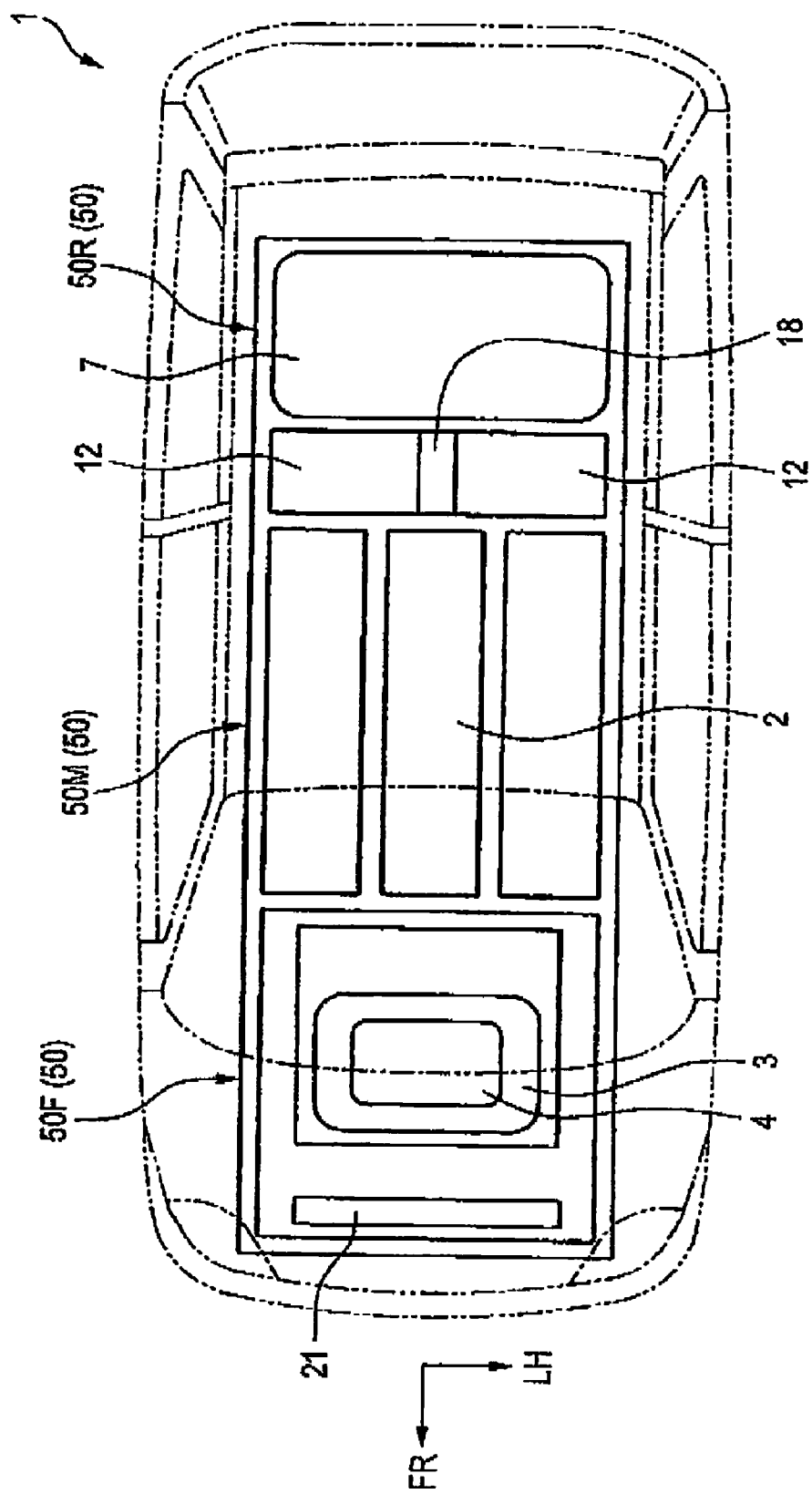
FIG. 2 is a plane view illustrating an upper surface of the fuel cell vehicle.

As shown in FIGS. 1 and 2, a body frame 50 extending in a length wise direction and a width wise direction is formed at the lower portion of a floor part of the vehicle. Drive motor 3 and the compressor 4 are located in a front portion 50F of the body frame 50. The fuel cell stack 2 and its accessories are located in a main portion 50M of the body frame 50. The battery 12, the contactor box 18, and the hydrogen tank 7 are located in a rear portion 50R of the body frame 50.

The two batteries 12, 12 are disposed on the right and left sides, in the traveling direction, of the fuel cell vehicle 1, and the contactor box 18 is set between the two batteries 12, 12. The contactor box 18 is disposed so as to be lower in height than the two batteries 12, 12. Hereby, an air passage 20 is formed above the contactor box 18 and between side surfaces of the batteries 12, 12 facing each other. Further, the contactor box 18 has a slope portion 18a formed by chamfering its corner portion in a front portion thereof. The slope portion 18a functions as a guide portion for the air passage 20 and an air inlet 30. Namely, by the slope portion 18a formed on the contactor box 18, the air flowing from the front of the vehicle is readily introduced in the air passage 20 and the air inlet 30.

Figure 5:
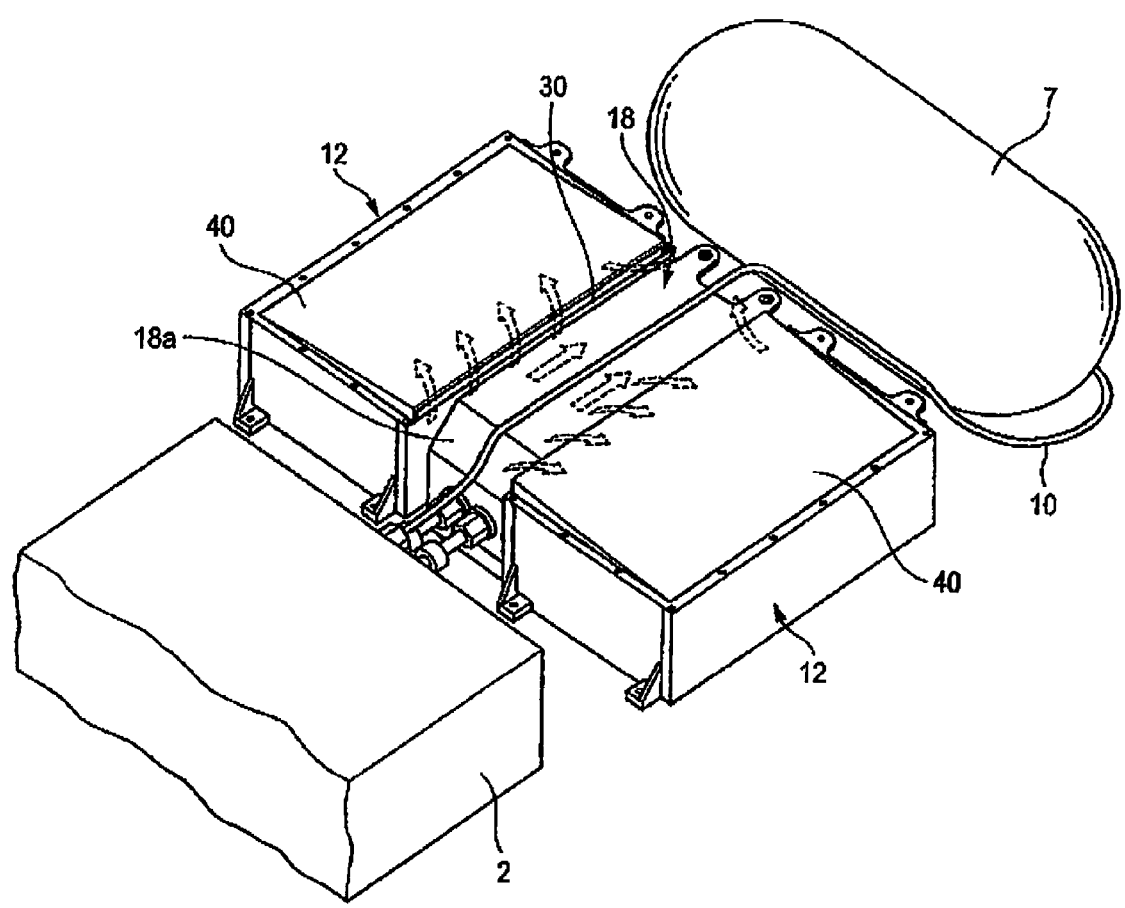
FIG. 5 is a main portion perspective view including a battery and a contactor box in the fuel cell vehicle.

Therefore, as shown in FIG. 5, the air introduced from the front of the vehicle flows in the air passage 20, whereby not only the batteries 12, 12 but also the contactor box 18 can be cooled. By such an integral arrangement of the batteries 12, 12 and the contactor box 18, the space necessary to cool the batteries 12, 12 and the contactor box 18 can be used in common. Therefore, the space necessary to cool the batteries 12, 12 and the contactor box 18 can be reduced, so that layout freedom of peripheral parts can be improved.

Figure 6:
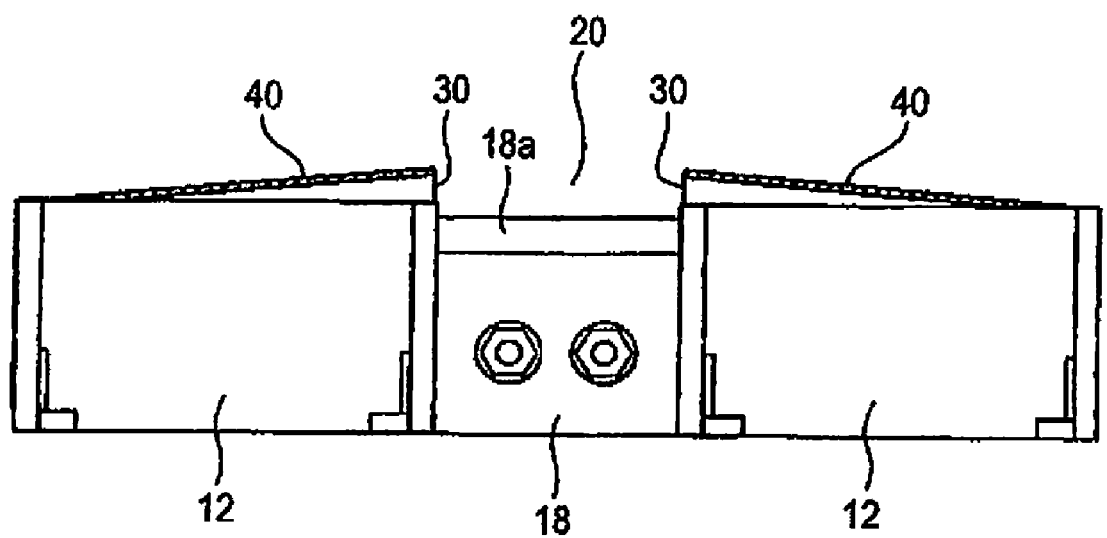
FIG. 6 is a front view of the battery and the contactor box of the fuel cell vehicle.

Further, as shown in FIGS. 5 and 6, a roof portion 40 is formed on the upper portion of each of the batteries 12, 12, which slopes upward from the out side portion toward the center portion of the vehicle in the width wise direction (in other words, as the roof portion comes closer to the air passage 20). The inside of each of the roof portions 40, 40 is hollow, and the side surface of each roof portion 40 facing the air passage 20 is opened thereby to form the air inlet 30.

Hereby, it is possible to positively introduce the air flowing in the air passages 20 onto the upper surfaces of the batteries 12, 12 through the air inlets 30, 30, so that it is possible to ventilate and cool the batteries 12, 12 efficiently.

The hydrogen supply pipe 10 for supplying the fuel from the hydrogen tank 7 to the fuel cell 2 is arranged, so as to run along the length wise direction of the vehicle, on the upper surface of the contactor box 18.

Hereby, the contactor box 18 can be cooled more by the hydrogen flowing in the hydrogen supply pipe 10, so that the cooling efficiency of the contactor box 18 can be increase ever more. On the other hand, the fuel flowing in the hydrogen supply pipe 10 is heated by the contactor box 18 and supplied to the fuel cell 2. Hereby, also in a fuel cell system of fuel circulation type, the fuel can be supplied to the fuel cell 2 in a state where the humidity of the fuel is kept constant or less. Therefore, the operation of the fuel cell 2 can be stably performed.

Though the content of the invention has been described above on the basis of the exemplary embodiment, it is apparent that the content of the invention is not limited to the above exemplary embodiment. For example, though the fuel cell vehicle having the fuel cell as the drive source has been described in the exemplary embodiment, the vehicle is not limited to the fuel cell vehicle as long as the vehicle is equipped with an electric storage apparatus and a drive unit for controlling the electric storage apparatus. For example, the vehicle may be a hybrid car having an engine and a motor as drive sources. Further, though the electric storage apparatus using the battery has been described, the invention can be applied also to an electric storage apparatus using a capacitor in place of the battery or together with the battery. Further, the air for cooling the electric storage apparatus and the drive unit may be air outside the vehicle, or may be forcibly introduced in the air passage by means of a ventilation unit such as a fan.

While there has been described in connection with the exemplary embodiment of the present invention, it will be obvious to those skilled in the art that various changes and modification may be made therein without departing from the present invention. It is aimed, therefore, to cover in the appended claim all such changes and modifications as fall within the true spirit and scope of the present invention.

What is claimed is:

1. A vehicle having an electric storage apparatus, comprising:
- at least two energy storage units disposed on right and left sides, in a traveling direction, of the vehicle;
- a drive unit, for electrically controlling said energy storage units, disposed between side surfaces of said energy storage units, facing each other
wherein said drive unit is lower in height than said energy storage units;
- a fuel cell disposed on one side of said drive unit and said energy storage units in a length wise of the vehicle;
- a fuel tank disposed on an opposite side of said energy storage units with respect to the fuel cell, in the length wise direction of the vehicle, said fuel tank storing fuel to be supplied to said fuel cell; and
- an introducing pipe connecting said fuel tank and said fuel cell,
wherein introducing pipe is disposed on the upper surface of said drive unit.

2. The vehicle according to claim 1, wherein each of said energy storage units includes an air inlet, said air inlets facing one another.

3. The vehicle according to claim 1, wherein a top surface of said drive unit and the side surfaces of said energy storage units form an air passage therebetween.

4. The vehicle according to claim 1, wherein a top surface of said drive unit is sloped downward toward a front portion thereof.

5. The vehicle according to claim 2, wherein said air inlet is formed below a roof portion of each of said energy storage units, each of said roof portions sloping upward from an outside to a center portion of the vehicle in a width wise direction.

* * * * *